US008624425B2

(12) United States Patent
Feng et al.

(10) Patent No.: US 8,624,425 B2
(45) Date of Patent: Jan. 7, 2014

(54) VOLTAGE ADJUSTMENT SYSTEM

(75) Inventors: Lan-Yi Feng, Shenzhen (CN); Qiang Guo, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 478 days.

(21) Appl. No.: 13/087,393

(22) Filed: Apr. 15, 2011

(65) Prior Publication Data

US 2012/0153925 A1   Jun. 21, 2012

(30) Foreign Application Priority Data

Dec. 21, 2010   (CN) .......................... 2010 1 0602243

(51) Int. Cl.
*H02J 1/00*    (2006.01)
(52) U.S. Cl.
USPC ............................................................. 307/6

(58) Field of Classification Search
USPC ............................................................. 307/6
See application file for complete search history.

*Primary Examiner* — Robert L. Deberadinis
(74) *Attorney, Agent, or Firm* — Altis Law Group, Inc.

(57) ABSTRACT

A voltage adjustment system includes a power supply for providing an initial voltage signal, a plurality of buck converters for receiving the initial voltage signal and generating one adjustable output voltage signal respectively, a microcontroller for determining one adjustable output voltage signal to output and determining whether a variable voltage signal generated by a buck converter that outputs the adjustable output voltage signal is positive or negative, a display unit for displaying value of the adjustable output voltage signal that is outputted, a plurality of voltage control units corresponding to the plurality of buck converters, and a voltage variation adjustment circuit including two buttons. The variable voltage signal is added to the adjustable output voltage signal generated by the same buck converter. Selection of the two buttons causes the microcontroller to adjust absolute value of the variable voltage signal generated by the buck converter through the corresponding voltage control unit.

17 Claims, 5 Drawing Sheets

VOLTAGE ADJUSTMENT SYSTEM

BACKGROUND

1. Technical Field

The present disclosure relates to a voltage adjustment system, and particularly to a voltage adjustment system for electrical testing of electronic devices.

2. Description of Related Art

Many electronic devices such as computers may require electrical testing before delivery. Different operating circuits of the electronic device require different operating voltages during the electrical testing process. For example, electrical testing an electronic device may require operating voltages of 3.3 volts, 5 volts, and 12 volts, and when testing whether the electronic device works abnormally when the operating voltages have slightly changed, the operating voltages of 3.3 volts, 5 volts, and 12 volts may need to be slightly adjusted.

Different power supplies are needed to provide different operating voltages, and voltage adjustment circuits are needed to slightly adjust the operating voltages. Thus, many testing equipments lead to circuit complexity, and high cost.

Therefore, it is desired to provide a voltage adjustment system which can overcome the above-described deficiencies.

BRIEF DESCRIPTION OF THE DRAWINGS

Many aspects of the present voltage adjustment system can be better understood with reference to the following drawings. The components in the various drawings are not necessarily drawn to scale, the emphasis instead being placed upon clearly illustrating the principles of the present voltage adjustment system.

DETAILED DESCRIPTION

Figure 1:
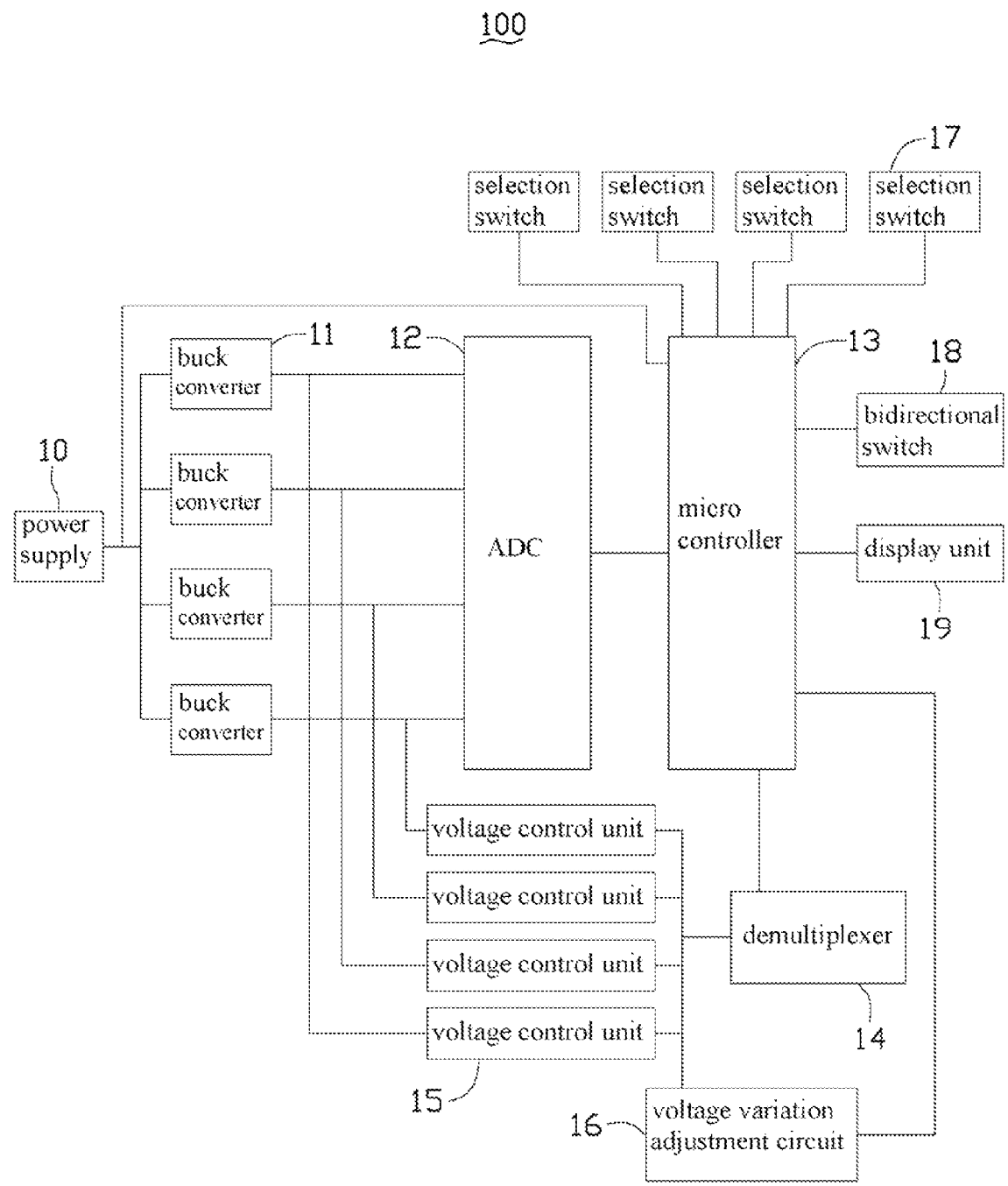
FIG. 1 is a block diagram of a voltage adjustment system according to one embodiment of the present disclosure.

Referring to FIG. 1, a voltage adjustment system 100 according to an exemplary embodiment of the present disclosure includes a power supply 10, a plurality of buck converters 11 electronically connected to the power supply 10, an analog-to digital converter (ADC) 12, a microcontroller 13, a demultiplexer 14, a plurality of voltage control units 15, a voltage variation adjustment circuit 16, a plurality of selection switches 17 corresponding to the plurality of buck converters 11, a bidirectional switch 18, and a display unit 19. The plurality of buck converters 11 are electronically connected to the ADC 12, and each buck converter 11 is electronically connected to a voltage control unit 15. The plurality of voltage control units 15 are electronically connected to the demultiplexer 14 and the voltage variation adjustment circuit 16. The plurality of buck converters 11, the ADC 12, the demultiplexer 14, the voltage variation adjustment circuit 16, the plurality of selection switches 17, the bidirectional switch 18, and the display unit 19 are all electronically connected to the microcontroller 13. The number of the buck converters 11, the voltage control units 15, and the selection switches 17 are the same, and determined by the number of desired output voltage signals. In this embodiment, the number of the desired output voltage signals is four.

Figure 2:
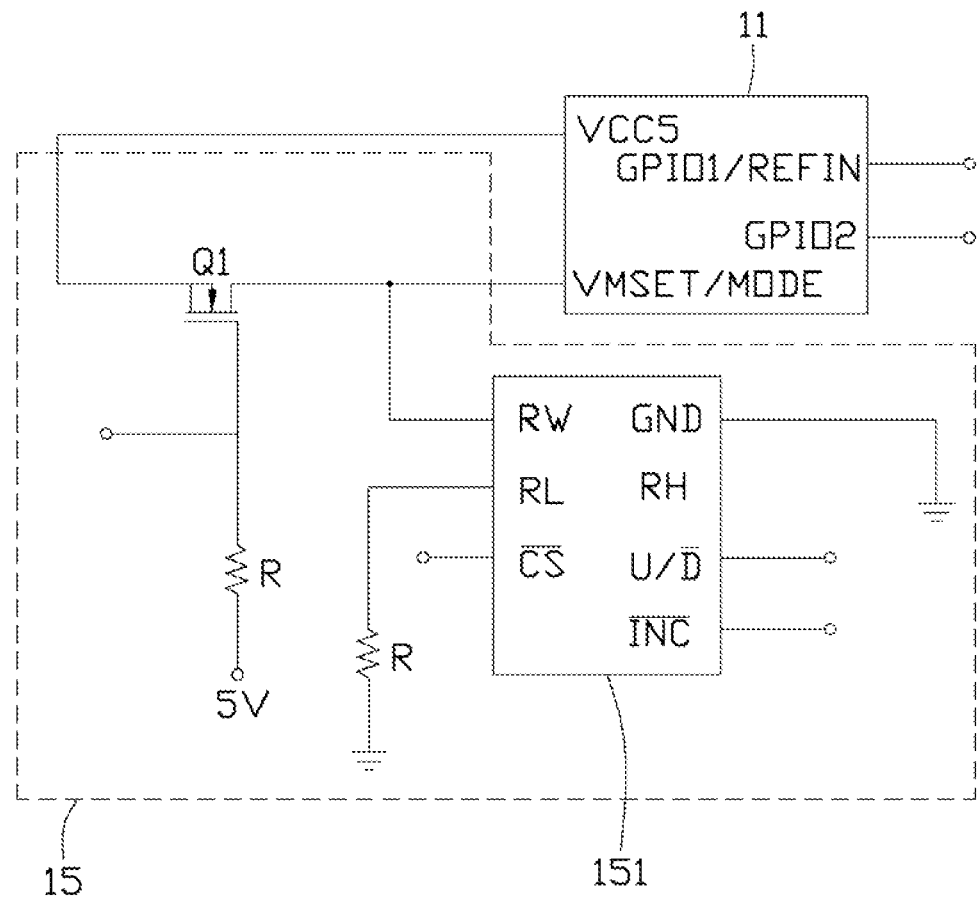
FIG. 2 is a circuit diagram of one embodiment of a buck converter and a voltage control unit of the voltage adjustment system shown in FIG. 1.

Referring to FIG. 2, each buck converter 11 includes a voltage terminal VCC5, a function terminal VMSET/MODE, two general purpose input/output terminals GPIO1/REFIN, GPIO2. Each voltage control unit 15 includes an n-channel transistor Q1, a digital potentiometer 151, and two current limiting resistors R. A drain electrode of the transistor Q1 is electronically connected to the voltage terminal VCC5, a source electrode of the transistor Q1 is electronically connected to the function terminal VMSET/MODE, and a gate electrode of the transistor Q1 is electronically connected to a 5 volts input terminal through a current limiting resistor R.

The digital potentiometer 151 includes three control terminals $\overline{INC}$, $\overline{CS}$, U/$\overline{D}$ and three resistor terminals RH, RW, RL. The three control terminals $\overline{INC}$, $\overline{CS}$, U/$\overline{D}$ are operable to receive control signals according to which a resistance of the digital potentiometer 151 is adjusted. The resistor terminal RH is floating, the resistor terminal RW is electronically connected to the function terminal VMSET/MODE, and the resistor terminal RL is grounded through a current limiting resistor R. The digital potentiometer 151 can be referred to as a rheostat that is digitally controlled, the resistor terminal RW can be referred to as a wiper terminal of the rheostat, and the resistor terminals RH, RL can be referred to as two ends of the rheostat. The operation modes of the digital potentiometer 151 are shown in the following table, and "X" in the table is capable of representing any value.

| $\overline{INC}$ | $\overline{CS}$ | U/$\overline{D}$ | Operation |
| --- | --- | --- | --- |
| high to low | low | high | wiper terminal toward RH |
| high to low | low | low | wiper terminal toward RL |
| High | low to high | X | store wiper terminal position |

Figure 3:
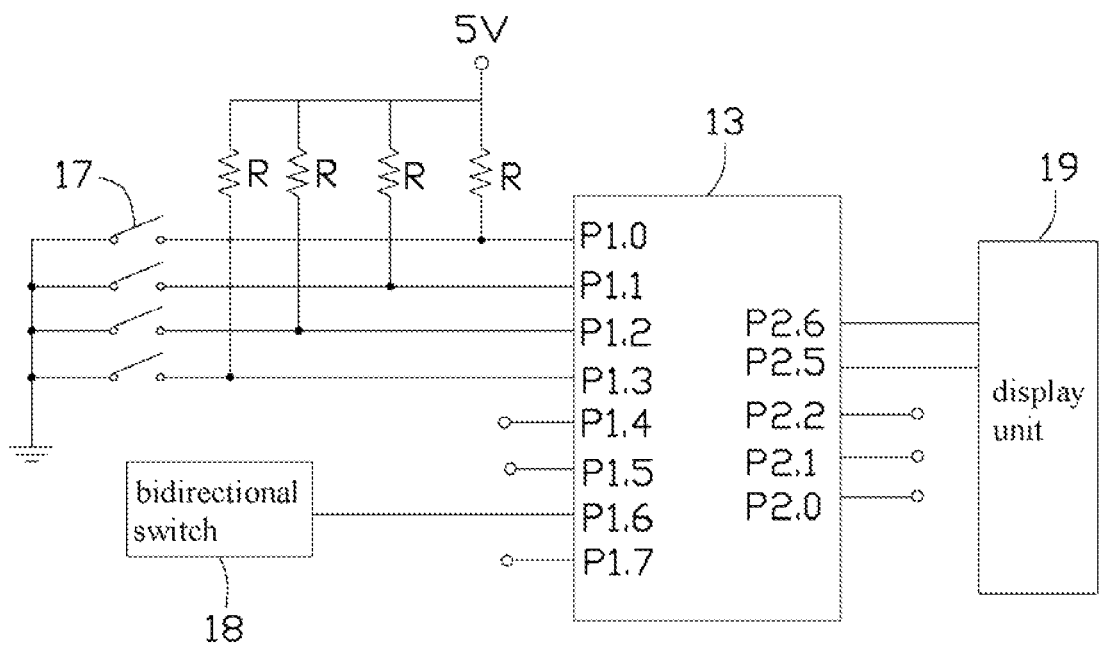
FIG. 3 is a circuit diagram of one embodiment illustrating electrical connections between a microcontroller, selection switches, a bidirectional switch, and a display unit of the voltage adjustment system shown in FIG. 1.

Referring to FIG. 3, in this embodiment, the microcontroller 13 is a single chip microcomputer. The microcontroller 13 includes a plurality of pins P1.0~P1.7, P2.0~P2.2, P2.5~P2.6. Each of the pins P1.0~P1.3 is grounded through a selection switch 17. Each selection switch 17 is electronically connected to a 5 volts input terminal through a current limiting resistor R. According to switch states of the selection switches 17, the pins P1.4, P1.5 outputs selection signals to the ADC 12 and the demultiplexer 14. The pin P1.6 is electronically connected to the bidirectional switch 18. According to selection of the bidirectional switch 18, the pin P1.7 outputs a voltage variation control signal to the general purpose input/output terminal GPIO1/REFIN. The pin P2.0 is electronically connected to the control terminal U/$\overline{D}$. The pins P2.1, P2.2 are electronically connected to the voltage variation adjustment circuit 16. The pins P2.5, P2.6 are electronically connected to the display unit 19.

Figure 4:
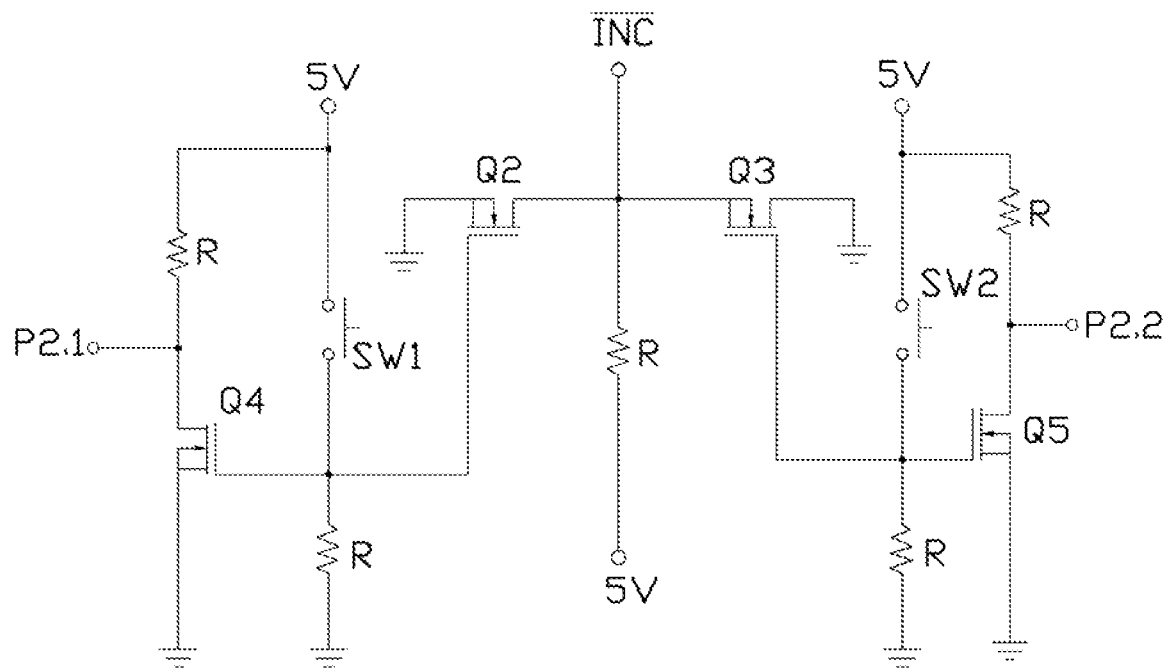
FIG. 4 is a circuit diagram of one embodiment of a voltage variation adjustment circuit of the voltage adjustment system shown in FIG. 1.

Referring to FIG. 4, the voltage variation adjustment circuit 16 includes four n-channel transistors Q2, Q3, Q4, Q5, a plurality of current limiting resistors R, and two buttons SW1, SW2. The control terminal $\overline{INC}$ of each digital potentiometer 151 is grounded through the transistor Q2, and the control terminal $\overline{INC}$ of each digital potentiometer 151 is also grounded through the transistor Q3. A gate electrode of the transistor Q2 and a gate electrode of the transistor Q4 are electronically connected to the button SW1. The gate electrode of the transistor Q4 is grounded through a current limiting resistor R, a drain electrode of the transistor Q4 is electronically connected to the pin P2.1, and a source electrode of the transistor Q4 is grounded. A gate electrode of the transistor Q3 and a gate electrode of the transistor Q5 are electronically connected to the button SW2. The gate electrode of the transistor Q5 is grounded through a current limiting resistor R, a drain electrode of the transistor Q5 is electronically connected to the pin P2.2, and a source electrode of the transistor Q5 is grounded. The two buttons SW1, SW2 are electronically connected to a 5 volts input terminal.

Figure 5:
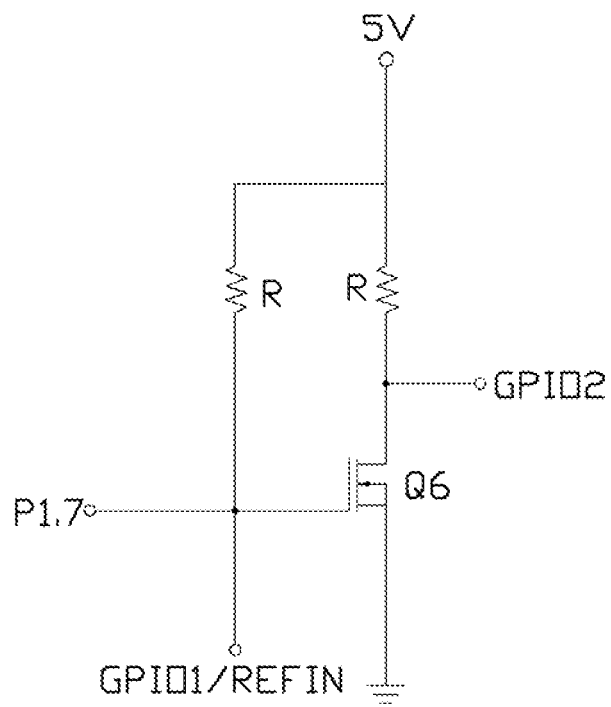
FIG. 5 is a circuit diagram of one embodiment illustrating electrical connections between the buck converter and the microcontroller of the voltage adjustment system shown in FIG. 1.

Referring to FIG. 5, the pin P1.7 is electronically connected to the general purpose input/output terminal GPIO1/REFIN. The general purpose input/output terminal GPIO1/REFIN is electronically connected to a gate electrode of a transistor Q6. A drain electrode of the transistor Q6 is electronically connected to the general purpose input/output terminal GPIO2. A source electrode of the transistor Q6 is grounded. The general purpose input/output terminal GPIO2 is electronically connected to a 5 volts input terminal through a current limiting resistor R.

Referring to FIGS. 1-5, the voltage adjustment system 100 functions as follows:

The power supply 10 sends an initial voltage signal to the four buck converters 11. The four buck converters 11 receive the initial voltage signal and generate four different output voltage signals V1, V2, V3, and V4 respectively. When the selection switch 17 corresponding to the buck converter 11 that generate the output voltage signal V1 is closed, the microcontroller 13 sends selection signals ADD-A, ADD-B to the ADC 12 and the demultiplexer 14 through the pins P1.4, P1.5. According to the selection signals ADD-A, ADD-B, the ADC 12 collects the output voltage signal V1, converts the output voltage signal V1 into a digital signal, and sends the digital signal to the microcontroller 13. The microcontroller 13 sends a display control signal to the display unit 19. The display unit 19 receives the display control signal and displays the value of the output voltage signal V1. The demultiplexer 14 receives the selection signals ADD-A, ADD-B and sends a low level signal (logic 0) Margin S1 to a voltage control unit 15 connected to the buck converter 11 that generate the output voltage signal V1. The voltage control unit 15 receives the low level signal Margin S1, and the low level signal Margin S1 is applied to the control terminal $\overline{CS}$ of the digital potentiometer 151 and the gate electrode of the transistor Q1. According to the low level signal Margin S1, the transistor Q1 turns off, then the function terminal VMSET/MODE is disconnected from the voltage terminal VCC5, and the buck converter 11 that generate the output voltage signal V1 generates a variable voltage signal $\Delta V_{OUT}$ added to the output voltage signal V1. That is the variable voltage signal $\Delta V_{OUT}$ is added to the output voltage signal V1 generated by the same buck converter 11.

When there is a need to slightly adjust the value of the output voltage signal V1, users may choose to increase or decrease the value of the output voltage signal V1 through the bidirectional switch 18. If the value of the output voltage signal V1 needs to be increased, the microcontroller 13 sends a low level signal (logic 0) to the general purpose input/output terminal GPIO1/REFIN through the pin P1.7. Then the transistor Q6 turns off, the voltage of the general purpose input/output terminal GPIO2 is at a high logic level, and then the variable voltage signal $\Delta V_{OUT}$ is positive. If the value of the output voltage signal V1 needs to be decreased, the microcontroller 13 sends a high level signal (logic 1) to the general purpose input/output terminal GPIO1/REFIN through the pin P1.7. Then the transistor Q6 turns on, the voltage of the general purpose input/output terminal GPIO2 is at a low logic level, and then the variable voltage signal $\Delta V_{OUT}$ is negative.

The adjustment process of the absolute value of the variable voltage signal $\Delta V_{OUT}$ is as follows:

If the absolute value of the variable voltage signal $\Delta V_{OUT}$ needs to be increased, the button SW2 is pressed. Then the transistors Q3, Q5 turn on, the voltage of the control terminal $\overline{INC}$ changes from logic high to logic low, and the voltage of the pin P2.2 changes from logic high to logic low. The microcontroller 13 sends a low level signal (logic 0) to the control terminal U/$\overline{D}$ through the pin P2.0. Referring to the above-mentioned table, the resistance between the resistor terminal RW and the resistor terminal RL is decreased. In this embodiment, the absolute value of the variable voltage signal $\Delta V_{OUT}$ is inversely proportional to the resistance between the resistor terminal RW, and then the absolute value of the variable voltage signal $\Delta V_{OUT}$ is increased.

If the absolute value of the variable voltage signal $\Delta V_{OUT}$ needs to be decreased, the button SW1 is pressed. Then the transistors Q2, Q4 turn on, the voltage of the control terminal $\overline{INC}$ changes from logic high to logic low, and the voltage of the pin P2.1 changes from logic high to logic low. The microcontroller 13 sends a high level signal (logic 1) to the control terminal U/$\overline{D}$ through the pin P2.0. Referring to the above-mentioned table, the resistance between the resistor terminal RW and the resistor terminal RL is increased, and then the absolute value of the variable voltage signal $\Delta V_{OUT}$ is decreased. The adjusted output voltage signal V1 is displayed on the display unit 19.

As detailed above, according to an initial voltage signal, the voltage adjustment system 100 generates a plurality of adjustable output voltage signals and is easily operated.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A voltage adjustment system, comprising:
a power supply for providing an initial voltage signal;
a plurality of buck converters for receiving the initial voltage signal and generating one adjustable output voltage signal respectively;
a microcontroller for determining one of the adjustable output voltage signals to output and determining whether a variable voltage signal generated by a buck converter that outputs the adjustable output voltage signal is positive or negative;
a display unit for displaying value of the adjustable output voltage signal that is outputted;
a plurality of voltage control units; and
a voltage variation adjustment circuit including two buttons;
wherein each voltage control unit corresponds to one buck converter; the variable voltage signal is added to the adjustable output voltage signal generated by the same buck converter; selection of the two buttons causes the microcontroller to adjust absolute value of the variable voltage signal generated by the buck converter through the corresponding voltage control unit.

2. The voltage adjustment system as claimed in claim 1, wherein each voltage control unit comprises a digital potentiometer electronically connected to the corresponding buck converter.

3. The voltage adjustment system as claimed in claim 2, wherein the voltage variation adjustment circuit further comprises two transistors electronically connected to the digital potentiometer, and two transistors electronically connected to the microcontroller; each button of the voltage variation adjustment circuit is electronically connected to one transistor connected to the digital potentiometer and one transistor connected to the microcontroller.

4. The voltage adjustment system as claimed in claim 3, wherein the voltage adjustment system further comprises a bidirectional switch electronically connected to the microcontroller, according to selection of the bidirectional switch, the microcontroller determines the variable voltage signal generated by the buck converter is positive or negative.

5. The voltage adjustment system as claimed in claim 4, wherein when one of the buttons is pressed, the two transistors electronically connected to the pressed button turns on at the same time.

6. The voltage adjustment system as claimed in claim 4, wherein according to the selection of the buttons, the microcontroller sends control signals to the digital potentiometers; according to the control signals, the resistance of the digital potentiometer electronically connected to the buck converter that generate the variable voltage signal is adjusted to increase or decrease the absolute value of the variable voltage signal.

7. The voltage adjustment system as claimed in claim 6, wherein the voltage adjustment system further comprises a plurality of selection switches electronically connected to the microcontroller, and each selection switch corresponds to one buck converter.

8. The voltage adjustment system as claimed in claim 6, wherein the voltage adjustment system further comprises a demutiplexer electronically connected to the microcontroller, the demutiplexer is electronically connected to the plurality of voltage control units.

9. A voltage adjustment system, comprising:
   a power supply;
   a plurality of buck converters for generating a plurality of adjustable output voltage signals;
   a microcontroller;
   a plurality of voltage control units corresponding to the plurality of buck converters;
   a voltage variation adjustment circuit electronically connected to the plurality of voltage control units; and
   a display unit;
   wherein the plurality of buck converters are electronically connected to the power supply; each voltage control unit is electronically connected to the corresponding buck converter; the plurality of buck converters, the voltage variation adjustment circuit, and the display unit are electronically connected to the microcontroller.

10. The voltage adjustment system as claimed in claim 9, wherein each voltage control unit comprises a digital potentiometer electronically connected to the corresponding buck converter.

11. The voltage adjustment system as claimed in claim 10, wherein the voltage variation adjustment circuit comprises two buttons, two transistors electronically connected to the digital potentiometer, and two transistors electronically connected to the microcontroller; each button is electronically connected to one transistor connected to the digital potentiometer and one transistor connected to the microcontroller.

12. The voltage adjustment system as claimed in claim 11, wherein the voltage adjustment system further comprises a bidirectional switch electronically connected to the microcontroller, the microcontroller determines one adjustable output voltage signal to output, and according to selection of the bidirectional switch, the microcontroller determines whether a variable voltage signal generated by the buck converter that output the adjustable output voltage signal is positive or negative.

13. The voltage adjustment system as claimed in claim 12, wherein the variable voltage signal is added to the adjustable output voltage signal generated by the same buck converter.

14. The voltage adjustment system as claimed in claim 13, wherein when one of the buttons is pressed, the two transistors electronically connected to the pressed button turns on at the same time.

15. The voltage adjustment system as claimed in claim 13, wherein according to the selection of the buttons, the microcontroller sends control signals to the digital potentiometers; according to the control signals, the resistance of the digital potentiometer electronically connected to the buck converter that generate the variable voltage signal is adjusted to increase or decrease the absolute value of the variable voltage signal.

16. The voltage adjustment system as claimed in claim 15, wherein the voltage adjustment system further comprises a plurality of selection switches electronically connected to the microcontroller, and each selection switch corresponds to one buck converter.

17. The voltage adjustment system as claimed in claim 15, wherein the voltage adjustment system further comprises a demutiplexer electronically connected to the microcontroller, the demutiplexer is electronically connected to the plurality of voltage control units.

\* \* \* \* \*